(12) United States Patent
Kammerstetter

(10) Patent No.: US 9,488,122 B2
(45) Date of Patent: Nov. 8, 2016

(54) SYSTEM AND METHOD FOR MEASURING INJECTION PROCESSES IN A COMBUSTION ENGINE

(75) Inventor: Heribert Kammerstetter, Oberalm (AT)

(73) Assignee: AVL LIST GMBH, Graz (AT)

( * ) Notice: Subject to any disclaimer, the term of this patent is extended or adjusted under 35 U.S.C. 154(b) by 1028 days.

(21) Appl. No.: 13/498,988

(22) PCT Filed: Oct. 1, 2010

(86) PCT No.: PCT/EP2010/064626
§ 371 (c)(1),
(2), (4) Date: Apr. 23, 2012

(87) PCT Pub. No.: WO2011/039343
PCT Pub. Date: Apr. 7, 2011

(65) Prior Publication Data
US 2012/0203447 A1    Aug. 9, 2012

(30) Foreign Application Priority Data
Oct. 1, 2009 (DE) .......................... 10 2009 043 718

(51) Int. Cl.
*F02D 41/22* (2006.01)
*F02D 41/38* (2006.01)
(Continued)

(52) U.S. Cl.
CPC ........... *F02D 41/22* (2013.01); *F02D 41/3809* (2013.01); *F02D 41/3863* (2013.01); *F02D 2041/224* (2013.01); *F02D 2200/0602* (2013.01); *F02D 2200/0606* (2013.01);
(Continued)

(58) Field of Classification Search
CPC ................ F02D 2041/224; F02D 2200/0602; F02D 2200/0606; F02D 2200/0614; F02D 41/22; F02D 41/3809; F02D 41/3863; G01F 3/00; G01F 9/00; G01M 15/09
USPC ........ 701/103, 104, 114; 123/299, 399, 431, 123/436, 445–466, 472, 478, 480
See application file for complete search history.

(56) References Cited

U.S. PATENT DOCUMENTS 5,178,115 A * 1/1993 Daly .............................. 123/470
5,663,881 A * 9/1997 Cook, Jr. ...................... 701/104
(Continued)

FOREIGN PATENT DOCUMENTS

CN    1 942 663 A    4/2007
DE    197 40 608 A1  3/1999
(Continued)

*Primary Examiner* — Erick Solis
*Assistant Examiner* — Carl Staubach
(74) *Attorney, Agent, or Firm* — Norman B. Thot

(57) ABSTRACT

A system for measuring an injection process in a combustion engine includes a tank configured to hold a fuel. A storage container is configured to hold a compressed fuel. At least one injection valve is arranged at the storage container. A fuel line in which a fuel conveying pump and a high-pressure fuel pump are arranged. The fuel conveying pump and the high-pressure fuel pump are configured to convey the fuel into the storage container. A first pressure sensor is configured to measure a pressure in the storage container. A detection device is configured to detect control data of the at least one injection valve. A measuring device is arranged in the fuel line. The measuring device is configured to measure a temporally resolved volumetric or gravimetric flow process. A processor is connected to the measuring device and to the first pressure sensor via a data transmission line.

12 Claims, 1 Drawing Sheet

(51) Int. Cl.
  *G01M 15/09* (2006.01)
  *F02M 65/00* (2006.01)
(52) U.S. Cl.
  CPC ....... *F02D2200/0614* (2013.01); *F02M 65/00* (2013.01); *G01M 15/09* (2013.01)

(56) References Cited

U.S. PATENT DOCUMENTS

| | | | |
|---|---|---|---|
| 6,088,647 A * | 7/2000 | Hemberger et al. | 701/104 |
| 6,874,480 B1 * | 4/2005 | Ismailov | F02M 51/0678 123/494 |
| 7,677,093 B2 * | 3/2010 | Christian | F02D 33/003 73/114.52 |
| 8,886,448 B2 * | 11/2014 | Evrard | G06F 17/00 701/100 |
| 2002/0000216 A1 * | 1/2002 | Ismailov | F02D 41/40 123/305 |
| 2002/0014224 A1 * | 2/2002 | Ismailov | F02D 41/40 123/494 |
| 2002/0134323 A1 * | 9/2002 | Yanagisawa | 123/1 A |
| 2006/0144131 A1 * | 7/2006 | Schulz et al. | 73/118.1 |
| 2006/0201244 A1 | 9/2006 | Metzler et al. | |
| 2007/0022826 A1 * | 2/2007 | Palazzolo | G01F 1/666 73/861.53 |
| 2007/0295310 A1 * | 12/2007 | Achleitner et al. | 123/495 |
| 2008/0041331 A1 * | 2/2008 | Puckett | 123/198 D |
| 2008/0109144 A1 | 5/2008 | Hofmeister | |
| 2009/0045267 A1 * | 2/2009 | Sutter et al. | 239/102.2 |
| 2010/0263630 A1 * | 10/2010 | Cinpinski et al. | 123/458 |
| 2011/0023818 A1 * | 2/2011 | Fulton et al. | 123/295 |
| 2012/0042657 A1 * | 2/2012 | Hodinot | F02C 7/232 60/772 |
| 2013/0276758 A1 * | 10/2013 | Pursifull | 123/456 |

FOREIGN PATENT DOCUMENTS

| | | |
|---|---|---|
| DE | 199 46 506 C1 | 7/2001 |
| DE | 103 31 228 B3 | 1/2005 |
| DE | 103 57 874 A1 | 7/2005 |
| DE | 10 2005 004 423 B3 | 6/2006 |
| DE | 10 2007 030 003 A1 | 1/2009 |
| EP | 2 090 766 A2 | 8/2009 |
| JP | 2003-239797 A | 8/2003 |
| JP | 2008-286121 A | 11/2008 |
| JP | 2009-174383 A | 8/2009 |
| WO | WO 2008/142908 A1 | 11/2008 |

* cited by examiner

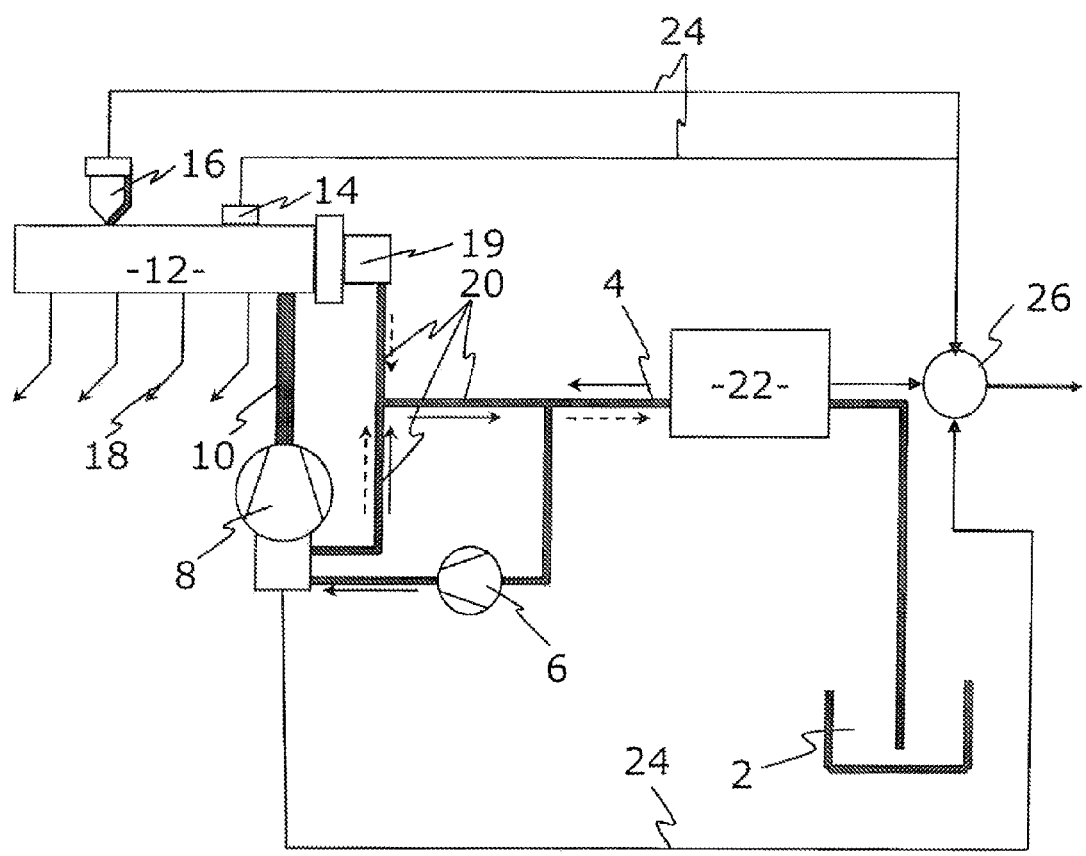

SYSTEM AND METHOD FOR MEASURING INJECTION PROCESSES IN A COMBUSTION ENGINE

CROSS REFERENCE TO PRIOR APPLICATIONS

This application is a U.S. National Phase application under 35 U.S.C. §371 of International Application No. PCT/EP2010/064626, filed on Oct. 1, 2010 and which claims benefit to German Patent Application No. 10 2009 043 718.5, filed on Oct. 1, 2009. The International Application was published in German on Apr. 7, 2011 as WO 2011/039343 A1 under PCT Article 21(2).

FIELD

The present invention refers to a system for measuring injection processes in a combustion engine comprising a tank which holds fuel, a storage container storing compressed fuel, at least one injection valve arranged at the storage container, a fuel line in which a fuel pump and a high-pressure fuel pump are arranged to convey the fuel into the storage container, a pressure sensor through which the pressure in the storage container can be determined, and means for detecting the control data of the injection valves. The present invention also provides a method for measuring injection processes using such a system.

BACKGROUND

Such systems are substantially known per se and form the structure of the common-rail system of modern combustion engines. The pressure sensors arranged in the storage containers serve in particular for the failure analysis of such systems.

DE 199 46 506 C1 describes a method for detecting a malfunction in the pressure system of an engine wherein a pressure signal of a pressure sensor is registered in a temporally resolved manner so that periodic pressure variations caused by the operation of the injectors and the piston strokes of the piston pump can be monitored. The development of the pressure signal is measured and compared to a stored pattern so that a malfunction is deduced from a deviation of the pattern with respect to amplitude or periodicity. The difference between the largest and the smallest pressure measurement signal within a period is also determined. A malfunction in the system is again deduced should this difference differ from the stored pattern. The determination of a rate-of-discharge curve is not disclosed.

A method for monitoring the functionality of an injection system is described in DE 10 2005 004 423 B3 wherein a malfunction is deduced from a deviation from a set pressure curve using the measured pressure curve of a sensor arranged at the storage container. Both the time characteristic of the pressure and the absolute pressure are here considered. This method also does not allow the determination of an actual rate-of-discharge curve for individual valves.

A similar structure is described in DE 197 40 608 A1. In this case, however, a pressure curve in the storage container is detected with high resolution by the pressure sensor and a pattern is obtained from the pressure curve through which a fuel injection-related parameter, such as the injection volume of the injection time, is determined individually for each combustion chamber and each injection process. This is done via a neural network. However, this network first has to be trained at a test bench in order to obtain plausible results. The absolute values of the injection volumes are in particular impossible to determine without a previous learning process of the network. A separate learning process must thus be carried out for each engine so that an application in serial production is not feasible.

SUMMARY

An aspect of the present invention was to provide a system and a method for measuring injection processes in a combustion engine which not only allow for failure detection, but which also allow for an exact determination of rate-of-discharge curves. A further, alternative, aspect of the present invention is to allow the determination of absolute values and to differentiate between the pilot injection and the main injection for each single cylinder.

In an embodiment, the present invention provides a system for measuring an injection process in a combustion engine which includes a tank configured to hold a fuel. A storage container is configured to hold a compressed fuel. At least one injection valve is arranged at the storage container. A fuel line in which a fuel conveying pump and a high-pressure fuel pump are arranged. The fuel conveying pump and the high-pressure fuel pump are configured to convey the fuel into the storage container. A first pressure sensor is configured to measure a pressure in the storage container. A detection device is configured to detect control data of the at least one injection valve. A measuring device is arranged in the fuel line. The measuring device is configured to measure a temporally resolved volumetric or gravimetric flow process. A processor is connected to the measuring device and to the first pressure sensor via a data transmission line.

BRIEF DESCRIPTION OF THE DRAWINGS

The present invention is described in greater detail below on the basis of embodiments and of the drawings in which:

FIG. 1 shows a system for measuring an injection processes in a combustion engine.

DETAILED DESCRIPTION

In an embodiment of the present invention, a processor is used which is connected to a device for measuring temporally resolved volumetric or gravimetric flow processes and to the pressure sensor via data transmission lines, the device being arranged in the fuel line. Control times determined by the means for detecting the control data, measured values of the pressure sensor at the storage container and measured values of the device for measuring temporally resolved volumetric or gravimetric flow processes in the fuel line can thus be transmitted to processor and, from these measured values, the injection rate shapes of the injection valves can be computed in the processor by superposition of the storage container flows calculated from the measured pressure curves of the pressure sensor at the storage container with the measured values of the device for measuring temporally resolved volumetric flow processes in the fuel line. By using the additional device for measuring temporally resolved volumetric or gravimetric flow processes, the value obtained from the pressure curve can be computed back to a calibrated volumetric or gravimetric flow value so that statements on the absolute values of the injected volumes are possible. Differences between two injectors and, as a consequence, malfunctions in the system can also be identified and attributed.

In an embodiment of the present invention, a temperature sensor can, for example, be arranged at the storage container which is connected to the processor. The temperature in the storage container is accordingly measured by the temperature sensor at the storage container, the temperature curve is transmitted to the processor, the compressibility module of the fuel is calculated in the processor and the calculated compressibility module is thereafter used in the determination of the injection rate shape. A very precise determination of the absolute values of the injection volumes is thus achieved.

In an embodiment of the present invention, a pressure sensor can, for example, be arranged at the inlet of the high-pressure pump which is connected to the processor. The measured values of this pressure sensor are transmitted to the processor, a high-pressure pump flow is calculated in the processor based on the measured values, and subsequently, the calculated flow is superposed with the measured values of the device for measuring temporally resolved volumetric flow processes in the fuel line and with the calculated storage container flows. A corrected rate-of-discharge curve is calculated therefrom which also considers the apparent flow through the high-pressure pump caused by the changing set pressure in the rail and the resulting changing masses to be conveyed.

In an embodiment of the present invention, a temperature sensor can, for example, be provided at the inlet of the high-pressure vacuum pump which is connected to the processor so that the temperature at the inlet of the high-pressure pump is measured using the temperature sensor at the inlet of the high-pressure pump, the temperature curve is transmitted to the processor, the compressibility module of the fuel at the high-pressure pump is calculated in the processor and the calculated compressibility module is used in determining the high-pressure pump flow. A still improved result of the computation of the rate-of-discharge curve is thereby achieved since the measured apparent flow can also be determined in an accurate manner.

In an embodiment of the present invention, a fuel return line can lead from the high-pressure pump or from the storage container to the tank via a pressure regulation valve, whereby an additional possibility for a pressure regulation is provided.

In an embodiment of the present invention, the fuel line can form the fuel return line in the section where the device for measuring temporally resolved volumetric flow processes is arranged. This allows omitting additional sensors and further devices for measuring flow processes in the return lines that would additionally have to be provided.

In an embodiment of the present invention, a system and an associated method are accordingly provided with which injection volumes can be determined exactly in a common rail system. A resolution is here possible for each individual injector, even allowing the differentiation between the pilot injection and the main injection. The calculation of the rate-of-discharge curves is thus accurate to the cycle and cylinder-selective. A use in diagnosing the injection system is also possible.

An embodiment of a system according to the present invention is schematically illustrated in FIG. 1. The present invention will be described hereunder with reference to FIG. 1.

The system illustrated essentially comprises the components of a known common rail fuel system. A tank 2 is in communication with a fuel pump 6 via a fuel line 4. The pump conveys fuel to a high-pressure fuel pump 8 which most often is a piston pump. A high-pressure line 10 provides for fluid communication between the piston pump and a storage container 12 in which a pressure sensor 14 and a temperature sensor 16 are arranged. Further, in the present embodiment, four fuel injection valves 18 are arranged at the storage container 12, through which fuel can be injected into associated cylinders of a combustion engine.

A pressure regulation valve 19 is further arranged at the storage container 12, which, like the inlet of the high-pressure pump 8, is connected with a fuel return line 20 via which excess fuel can be returned to the tank 2. This fuel return line 20 first opens into the fuel line 4 in which a differential flow or a resultant fuel flow is thus created in this portion of the fuel line.

According to the present invention, this resultant fuel volume conveyed into the storage container 12 is measured by means of a device 22 for measuring volumetric flow processes, which device is arranged in the fuel line 4 between the tank 2 and the branch to the fuel return line 20.

Such a device 22 is described in DE 103 31 228 B3 and comprises a rotary displacement device and a translational volume difference sensor arranged in a bypass channel to the displacement device, the sensor being in the form of a piston arranged in a measuring chamber. The course of the piston is continuously detected, the pump being operated substantially at a constant speed during one cycle. The conveying and the return of the fuel cause an overlapping movement of the piston which is a measure of the volume actually conveyed into the storage container. In addition, a pressure sensor and a temperature sensor are provided in the measuring chamber, whose measured values are supplied to an evaluation unit so that apparent flows caused by pressure and temperature variations can be eliminated. The processes occurring between the high-pressure pump 8 and the injectors 18 cannot, however, be measured by this device 22.

For this reason, the pressure sensor 14, the temperature sensor 16 and the device 22 for measuring volumetric flow processes are connected to a processor 26 via data transmission lines 24. The processor 26 stores a rail model for calculating temporally resolved volumetric flow processes. In addition, models for various lines and volumes can be stored which have a certain size and may thus cause apparent flows due to pressure and temperature variations. For example, the pump model illustrated can be used which provides further improvement to the results of the rail model. However, this requires the arrangement of further sensors, such as pressure sensors and temperature sensors, in the vicinity of the high-pressure pump 8.

When calculating the instantaneous fuel consumption, it has to be taken into consideration that in particular in the storage container 12, due to the given volumes, slight pressure variations will result in significantly different measured volumes because of the compressibility of the fuel.

According to the present invention, first the control data and the control times, respectively, of the injection valves 18 are transmitted to the processor 26. This may be done by a direct transmission of the data from the engine control unit to the processor. It is also conceivable to measure the opening times through corresponding current and position sensors.

At the same time, the measured values of the pressure sensor 14 at the storage container 12 and the measured values of the device 22 for measuring temporally resolved volumetric flow processes in the fuel line 4 are transmitted to the processor 26. The pressure variations measured by means of the pressure sensor 14 are first weighted using an optional proportionality factor and are added over a sufficient period of time. The sum of these weighted pressure variations is then compared with the flow measured by the device 22 for measuring temporally resolved volumetric flow processes, from which comparison the proportionality factor can be calculated by superposition. Given a constant proportionality factor, a concrete volume flow and thus a rate-of-discharge curve for that period of time can then be calculated for each individual subset thereof, i.e., for any optional phase thereof.

It has been found that even very short phases around the injection can be used herein.

A further improvement of the results can be achieved by measuring the temperature in the storage container in addition to the pressure. Variations of the temperature in the storage container cause apparent flows that can, however, be calculated with the formula $\Delta V_T = V_0 \cdot \alpha \cdot \Delta T$. Using the corresponding results, the determined flow volumes can thereafter be calculated.

A continuous measuring of the pressure at the high-pressure pump inlet allows the additional calculation of a high-pressure pump flow whereby the pressure development caused by an injection can be separated from a pressure variation caused by the conveying action of the high-pressure pump. For this purpose, the calculated rate-of-discharge curve is corrected by superposing the pump flow resulting from the measured pressure and the measured temperature with the measured values of the device for measuring temporally resolved volumetric flow processes in the fuel line. Injection volumes can thereby be separated exactly from the conveyed volumes. Of course, also in this case, the compressibility module can be corrected accordingly by measuring the temperature, so as to achieve further improved results.

With these methods and the structure described, injection processes in a high-pressure fuel system of a combustion engine can be quantified with high accuracy. It is also possible to differentiate between pilot and main injections and to determine the injection volumes. It is also of course possible to identify defective injection valves. Problems with injection valves that cause changed injection volumes can first be identified and then be compensated for by corresponding regulations and adjusted opening times.

The present invention is not limited to embodiments described herein; reference should be had to the appended claims.

What is claimed is:

1. A system for measuring an injection process in a combustion engine, the system comprising:
    a tank configured to hold a fuel;
    a storage container configured to hold a compressed fuel;
    at least one injection valve arranged at the storage container;
    a fuel line in which a fuel conveying pump and a high-pressure fuel pump are arranged, the fuel conveying pump and the high-pressure fuel pump being configured to convey the fuel into the storage container;
    a first pressure sensor configured to measure a pressure in the storage container;
    a detection device configured to detect control data of the at least one injection valve;
    a measuring device arranged in the fuel line which measures an instantaneous volumetric or gravimetric flow rate;
    a processor connected to the measuring device and to the first pressure sensor via a data transmission line;
    a fuel return line; and
    a pressure regulation valve,
    wherein,
    the fuel return line is arranged to lead from the high-pressure fuel pump or from the storage container to the tank via the pressure regulation valve, and
    the fuel line forms the fuel return line where the measuring device is arranged.

2. The system as recited in claim 1, further comprising a first temperature sensor arranged at the storage container, the first temperature sensor being connected to the processor.

3. The system as recited in claim 1, further comprising a second pressure sensor arranged at an inlet of the high-pressure fuel pump, the second pressure sensor being connected to the processor.

4. The system as recited in claim 3, further comprising a second temperature sensor arranged at the inlet of the high-pressure fuel pump, the second temperature sensor being connected to the processor.

5. A method for measuring an injection process in a combustion engine using a system, the method comprising:
    providing a system comprising:
        a tank configured to hold a fuel,
        a storage container configured to hold a compressed fuel,
        at least one injection valve arranged at the storage container,
        a fuel line in which a fuel conveying pump and a high-pressure fuel pump are arranged, the fuel conveying pump and the high-pressure fuel pump being configured to convey the fuel into the storage container,
        a first pressure sensor configured to measure a pressure in the storage container,
        a detection device configured to detect control data of the at least one injection valve,
        a measuring device arranged in the fuel line which measures an instantaneous volumetric or gravimetric flow rate,
        a processor connected to the measuring device and to the pressure sensor via a data transmission line,
        a fuel return line, and
        a pressure regulation valve,
        wherein,
        the fuel return line is arranged to lead from the high-pressure fuel pump or from the storage container to the tank via the pressure regulation valve, and
        the fuel line forms the fuel return line where the measuring device is arranged;
    determining control times with the detection device;
    measuring the pressure with the first pressure sensor in the storage container;
    measuring the instantaneous volumetric or gravimetric flow rate in the fuel line with the measuring device;
    transmitting the control times, the pressure and the instantaneous volumetric or gravimetric flow rate to the processor; and
    calculating a rate-of-discharge curve of the at least one injection valve in the processor by superpositioning a storage container flow calculated from a pressure development measured with the first pressure sensor in the storage container with the instantaneous volumetric or gravimetric flow rate in the fuel line measured with the measuring device.

6. The method as recited in claim 5, wherein:
    the system further comprises a first temperature sensor arranged at the storage container, the first temperature sensor being connected to the processor;
    and further comprising:

measuring temperatures in the storage container with the first temperature sensor so as to obtain a temperature curve;
transmitting the temperature curve to the processor;
calculating a compressibility module of the fuel in the processor with the temperature curve; and
determining a rate-of-discharge curve from the compressibility module.

7. The method as recited in claim 5, wherein:
the system further comprises a second pressure sensor arranged at an inlet of the high-pressure fuel pump, the second pressure sensor being connected to the processor; and
the further comprising:
transmitting pressure values measured by the second pressure sensor to the processor;
calculating a high-pressure fuel pump flow of the high-pressure fuel pump in the processor from the measured pressure values;
superpositioning the calculated high-pressure fuel pump flow with the temporally resolved volumetric or gravimetric flow process in the fuel line measured with the measuring device and the calculated storage container flow; and
calculating a corrected rate-of-discharge curve therefrom.

8. The method as recited in claim 7, wherein:
the system further comprises a temperature sensor arranged at the inlet of the high-pressure fuel pump, the temperature sensor being connected to the processor; and
further comprising:
measuring temperatures at the inlet of the high-pressure fuel pump with the temperature sensor so as to obtain a temperature curve;
transmitting the temperature curve to the processor;
calculating a compressibility module of the fuel at the high-pressure fuel pump in the processor; and
determining a high-pressure fuel pump flow with the compressibility module.

9. A method for adjusting an injection process in a combustion engine using a system, the method comprising:
providing a system comprising:
  a tank configured to hold a fuel,
  a storage container configured to hold a compressed fuel,
  at least one injection valve arranged at the storage container,
  a fuel line in which a fuel conveying pump and a high-pressure fuel pump are arranged, the fuel conveying pump and the high-pressure fuel pump being configured to convey the fuel into the storage container,
  a first pressure sensor configured to measure a pressure in the storage container,
  a detection device configured to detect control data of the at least one injection valve,
  a measuring device arranged in the fuel line which measures an instantaneous volumetric or gravimetric flow rate, and
  a processor connected to the measuring device and to the pressure sensor via a data transmission line,
  a fuel return line, and
  a pressure regulation valve,
  wherein,
  the fuel return line is arranged to lead from the high-pressure fuel pump or from the storage container to the tank via the pressure regulation valve, and the fuel line forms the fuel return line where the measuring device is arranged;
determining control times with the detection device;
measuring the pressure with the first pressure sensor in the storage container;
measuring the instantaneous volumetric or gravimetric flow rate in the fuel line with the measuring device;
transmitting the control times, the pressure and the instantaneous volumetric or gravimetric flow rate to the processor;
calculating a rate-of-discharge curve of the at least one injection valve in the processor by superpositioning a storage container flow calculated from a pressure development measured with the first pressure sensor in the storage container with the instantaneous volumetric or gravimetric flow rate in the fuel line measured with the measuring device; and
applying the calculated rate-of-discharge curve to adjust at least one injection valve in an internal combustion engine so as to adjust an injection process.

10. The method as recited in claim 9, wherein:
the system further comprises a first temperature sensor arranged at the storage container, the first temperature sensor being connected to the processor;
and further comprising:
measuring temperatures in the storage container with the first temperature sensor so as to obtain a temperature curve;
transmitting the temperature curve to the processor;
calculating a compressibility module of the fuel in the processor with the temperature curve;
determining a rate-of-discharge curve from the compressibility module; and
applying the calculated rate-of-discharge curve to adjust at least one injection valve in an internal combustion engine so as to adjust an injection process.

11. The method as recited in claim 9, wherein:
the system further comprises a second pressure sensor arranged at an inlet of the high-pressure fuel pump, the second pressure sensor being connected to the processor; and
the further comprising:
transmitting pressure values measured by the second pressure sensor to the processor;
calculating a high-pressure fuel pump flow of the high-pressure fuel pump in the processor from the measured pressure values;
superpositioning the calculated high-pressure fuel pump flow with the instantaneous volumetric or gravimetric flow rate in the fuel line measured with the measuring device and the calculated storage container flow;
calculating a corrected rate-of-discharge curve therefrom; and
applying the calculated corrected rate-of-discharge curve to adjust at least one injection valve in an internal combustion engine so as to adjust an injection process.

12. The method as recited in claim 11, wherein:
the system further comprises a second temperature sensor arranged at the inlet of the high-pressure fuel pump, the second temperature sensor being connected to the processor; and
the further comprising:
measuring temperatures at the inlet of the high-pressure fuel pump with the second temperature sensor so as to obtain a temperature curve;

transmitting the temperature curve to the processor;
calculating a compressibility module of the fuel at the high-pressure fuel pump in the processor;
determining a high-pressure fuel pump flow with the compressibility module; and
applying the calculated high-pressure fuel pump flow to adjust at least one injection valve in an internal combustion engine so as to adjust an injection process.

* * * * *